(12) United States Patent
Chen et al.

(10) Patent No.: US 11,975,468 B2
(45) Date of Patent: May 7, 2024

(54) COPLANAR MODULAR PRINTBARS

(71) Applicant: Hewlett-Packard Development Company, L.P., Spring, TX (US)

(72) Inventors: Chien-Hua Chen, Corvallis, OR (US); Si-lam J. Choy, Corvallis, OR (US); Michael W. Cumbie, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 183 days.

(21) Appl. No.: 17/312,349

(22) PCT Filed: Jul. 26, 2019

(86) PCT No.: PCT/US2019/043811
§ 371 (c)(1),
(2) Date: Jun. 9, 2021

(87) PCT Pub. No.: WO2021/021094
PCT Pub. Date: Feb. 4, 2021

(65) Prior Publication Data
US 2022/0143883 A1    May 12, 2022

(51) Int. Cl.
| | |
|---|---|
| B29C 45/00 | (2006.01) |
| B29C 45/14 | (2006.01) |
| B29C 45/32 | (2006.01) |
| B41J 2/16 | (2006.01) |
| B29K 63/00 | (2006.01) |
| B29L 31/00 | (2006.01) |

(52) U.S. Cl.
CPC .. *B29C 45/14508* (2013.01); *B29C 45/14065* (2013.01); *B29C 45/322* (2013.01); *B41J 2/1601* (2013.01); *B41J 2/1637* (2013.01); *B29K 2063/00* (2013.01); *B29K 2995/0012* (2013.01); *B29L 2031/767* (2013.01)

(58) Field of Classification Search
None
See application file for complete search history.

(56) References Cited

U.S. PATENT DOCUMENTS

| | | | |
|---|---|---|---|
| 5,160,945 A | 11/1992 | Drake | |
| 5,192,959 A | 3/1993 | Drake et al. | |
| 6,322,206 B1* | 11/2001 | Boyd | B41J 2/1629 347/85 |
| 6,450,614 B1 | 9/2002 | Scheffelin et al. | |
| 7,032,995 B2 | 4/2006 | Silverbrook et al. | |
| 8,118,405 B2 | 2/2012 | Xie et al. | |

(Continued)

FOREIGN PATENT DOCUMENTS

| | | |
|---|---|---|
| CN | 102157454 A | 8/2011 |
| CN | 108349254 A | 7/2018 |

(Continued)

*Primary Examiner* — Jacob T Minskey
*Assistant Examiner* — Adrien J Bernard
(74) *Attorney, Agent, or Firm* — Foley & Lardner LLP

(57) ABSTRACT

In various examples, a printbar is formed from multiple modular fluid ejection subassemblies joined together through a molding process that provides for a continuous planar substrate surface. A mold may secure the modular fluid ejection subassemblies during a molding process in which a runner conveys a molding material to seams between the joined modular fluid ejection subassemblies.

15 Claims, 10 Drawing Sheets

(56) References Cited

U.S. PATENT DOCUMENTS

| | | |
|---|---|---|
| 9,168,755 B2 | 10/2015 | Silverbrook et al. |
| 9,802,414 B2 | 10/2017 | Lee, II |
| 9,840,075 B1 | 12/2017 | Mu et al. |
| 2009/0289994 A1 | 11/2009 | Nystrom et al. |
| 2012/0018838 A1 | 1/2012 | Cellura et al. |
| 2014/0231542 A1 | 8/2014 | Sato et al. |
| 2015/0174800 A1 | 6/2015 | Imamura et al. |
| 2016/0001465 A1 | 1/2016 | Chen et al. |
| 2017/0066242 A1 | 3/2017 | Chen et al. |
| 2018/0215147 A1 | 8/2018 | Cumbie et al. |
| 2018/0323372 A1 | 11/2018 | Quinn et al. |

FOREIGN PATENT DOCUMENTS

| | | | | |
|---|---|---|---|---|
| EP | 3067212 A1 | 9/2016 | | |
| JP | H08187857 A | 7/1996 | | |
| WF | WO2017065743 A1 * | 4/2017 | .......... | B41J 2/14702 |
| WO | WO-2018199909 A1 | 11/2018 | | |

* cited by examiner

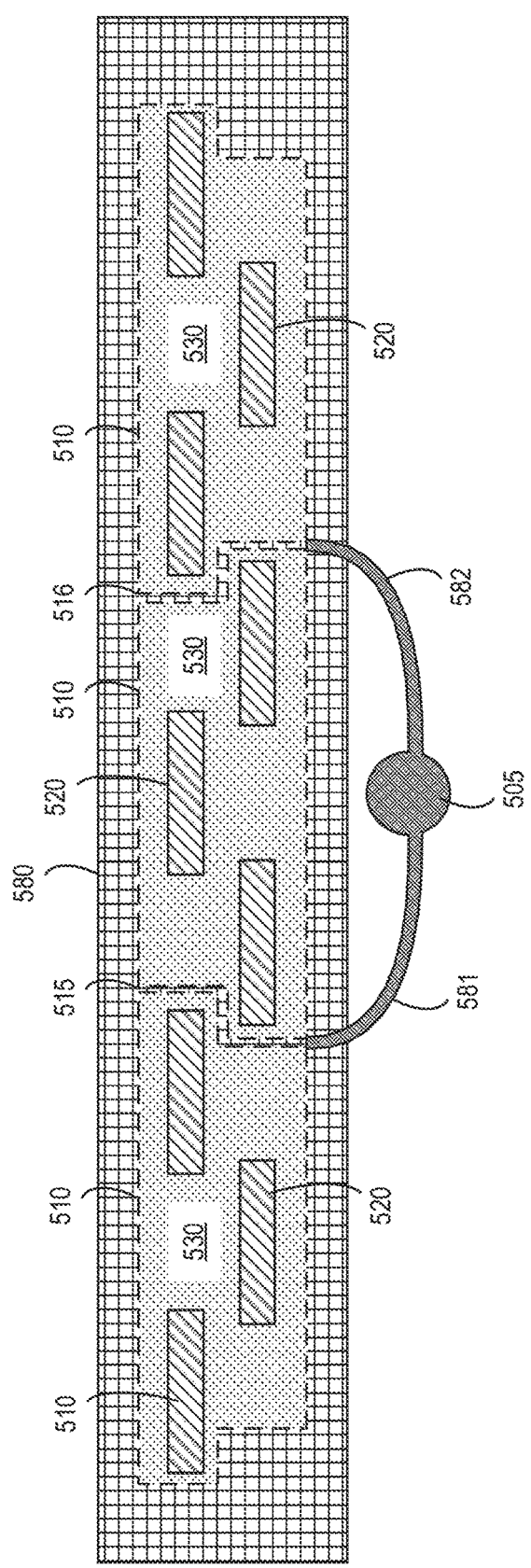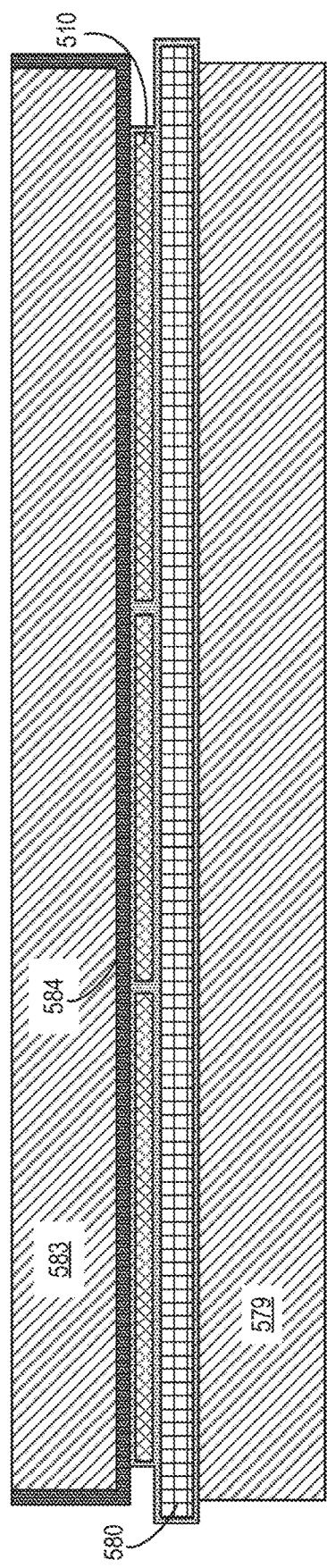
FIG. 5A
FIG. 5B

COPLANAR MODULAR PRINTBARS

BACKGROUND

Individual printheads can be used to print across the width of a print target, such as a paper surface or a surface of a three-dimensional object, by moving the printhead back and forth. In some instances, multiple printheads are stitched together to form a printbar. For example, multiple printheads may be stitched together to form a planar printbar. The seams or gaps between the individual printheads in the printbar may be filled with a stitching material, such as an adhesive.

BRIEF DESCRIPTION OF THE DRAWINGS

The written disclosure herein describes illustrative examples that are nonlimiting and non-exhaustive. Reference is made to certain of such illustrative examples that are depicted in the figures described below.

FIG. 5A illustrates a top view of an example conceptual block diagram of a coplanar molding process for joining three modular fluid ejection subassemblies.

FIG. 5B illustrates a side view of the example conceptual block diagram of the coplanar molding process for joining multiple modular fluid ejection subassemblies, including upper and lower flat mold cavities.

DETAILED DESCRIPTION

Figure 1:
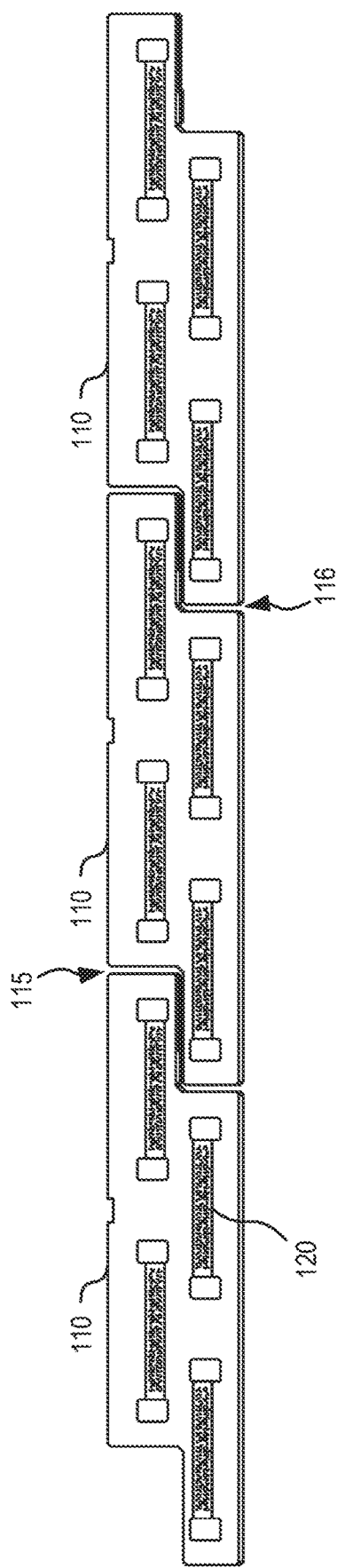
FIG. 1 illustrates a top view of example S-module fluid ejection subassemblies for creating a multi-module printbar.

In various examples, a mold receives multiple modular fluid ejection subassemblies. Each modular fluid ejection subassembly may comprise a substrate that supports multiple fluidic dies and any associated fluidic, mechanical, and electrical components for printing, such as manifolds, valves, contacts, etc. A fluid ejection subassembly may be referred to as a "printhead" that includes multiple fluidic dies.

The substrate may be a molded support material that supports an arrangement of fluidic dies. The modular fluid ejection subassemblies may be aligned between a lower mold cavity and upper mold cavity of a molding system, such that upper surfaces of the respective substrates of the modular fluid ejection subassemblies are coplanar. A manufacturing mold may include an upper cavity, a lower cavity, and a runner to convey mold material into seams between adjacent modular fluid ejection subassemblies. A molding system may include a manufacturing mold as well as a delivery device to deliver the mold material into the runner of the manufacturing mold.

The mold material used to join the modular fluid ejection subassemblies may be transferred or injected into the mold as part of a transfer molding or injection molding process. The upper cavity of the molding system may maintain the delivered mold material coplanar with the upper substrate surfaces of the modular fluid ejection subassemblies.

As illustrated and described below, the modular fluid ejection subassemblies may be S-module fluid ejection subassemblies that each include three or more fluidic dies in an S-shape. Alternative shapes and numbers of fluidic dies may be included on each individual printhead module. The fluidic dies may be, for example, thermal ink jet (TIJ) dies or piezo ink jet (PIJ) dies.

In various examples, the mold material used to join the modular fluid ejection subassemblies has the same coefficient of thermal expansion (CTE) as the substrate of each of the plurality of modular fluid ejection subassemblies. Due to a same or similar CTE, the mold material and the substrate of the subassemblies will react similarly to heat. For example, the mold material and the substrate of the subassemblies may expand and contract at the same rate during use because they have the same CTE.

Examples of suitable mold materials include epoxy mold compound (EMC) for use in transfer molding processes and thermoplastics for use in injection molding processes. Thermoplastics, such as polyethylene, polyphenylene sulfide, liquid crystal polymers, polysulfone, and the like may be suitable and closely match the CTE of fluid ejection subassemblies that include EMC substrates. In general, using a thermoplastic or EMC for the molding process with EMC-substrate thermal fluid ejection subassemblies allows for a closer CTE match than if silicon substrates are used for the fluid ejection subassemblies. Of course, it is appreciated, and those of skill in the art understand, that other molding-substrate material matches may be suitable and consistent with the present disclosure.

As described herein, a molding system can be used to form a seamless coplanar multi-module printbar without gaps or seams (even during heating and cooling) by aligning a plurality of modular fluid ejection subassemblies. The mold material may be injected or transferred into a runner that conveys the mold material into the seams between the various modular fluid ejection subassemblies. An upper cavity of the molding system aligns with a planar upper surface of the substrates of the fluid ejection subassemblies. The upper cavity of the molding system constrains the mold material and ensures that the mold material remains coplanar with the upper surface of the substrates as it is injected or transferred into the molding system. The molding process joins the plurality of modular fluid ejection subassemblies to form a seamless coplanar multi-module printbar with a seamless upper substrate surface with a constant or quasi-constant CTE.

Many of the processes described herein may be implemented as computer-controlled or computer-assisted processes. Thus, it is appreciated that hardware, firmware, software, and/or combinations thereof may be utilized to automate the molding process and techniques described herein. Software implementations may be implemented via instructions or computer code stored on a non-transitory computer-readable medium to be executed by a processor.

FIG. 1 illustrates a top view of three example S-module fluid ejection subassemblies 110 aligned to form a seamless coplanar multi-module printbar. As illustrated, each of the S-module fluid ejection subassemblies includes multiple fluidic dies 120 (of which one is labeled to avoid obscuring other aspects of the drawing). As illustrated, the S-module fluid ejection subassemblies 110 may be tightly fit together, but gaps 115 and 116 may remain between adjacent S-module fluid ejection subassemblies. In various examples, the fluidic dies may be arranged at any angle relative to the long edge of the seamless coplanar multi-module printbar.

Figure 2:
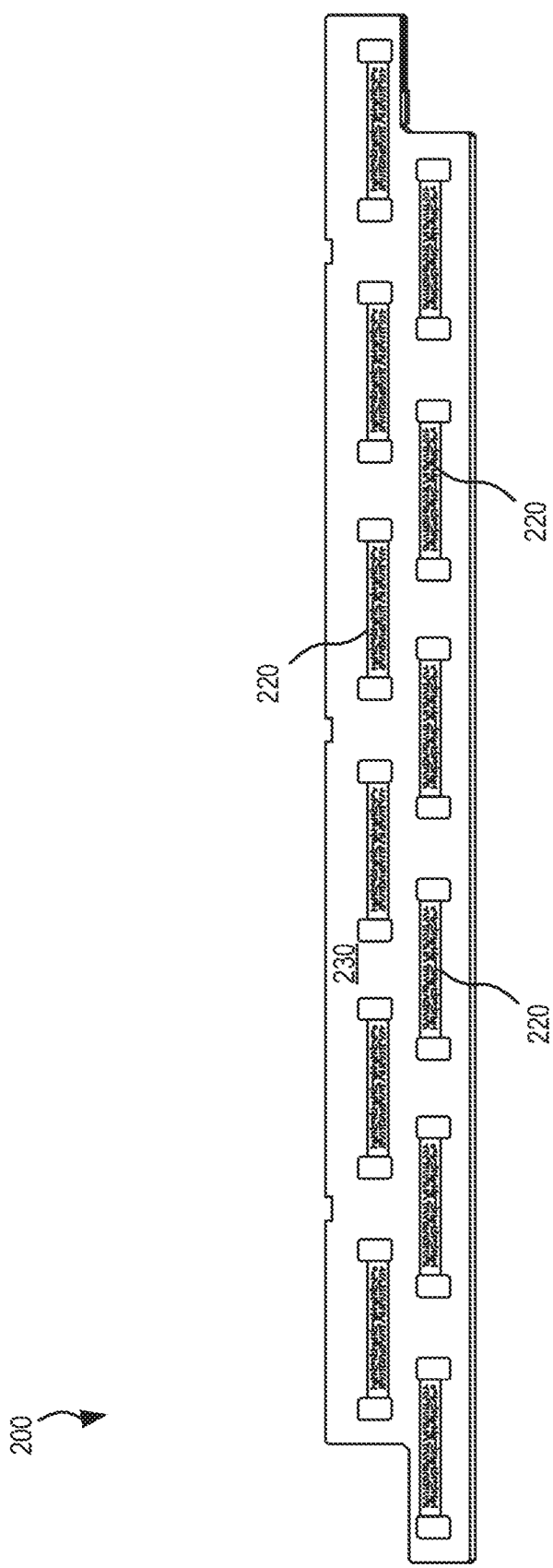
FIG. 2 illustrates a top view of an example seamless coplanar multi-module printbar formed from multiple S-module fluid ejection subassemblies.

FIG. 2 illustrates a top view of an example seamless coplanar multi-module printbar 200 formed from multiple S-module fluid ejection subassemblies, such as the S-module fluid ejection subassemblies 110 of FIG. 1. As illustrated, the printbar 200 includes a substrate 230 with a planar upper surface without any gaps or seams between the individual S-module fluid ejection subassemblies. Three of twelve fluidic dies 220 are labeled to avoid obscuring other aspects of the drawing. In the illustrated example, the fluidic dies 220 are arranged in overlapping rows along the width of the printbar 200. In other examples, the fluidic dies 220 may be arranged in a single row or multiple rows and may be overlapping or non-overlapping. Similarly, the long axis of each of the fluidic dies 220 may be arranged parallel to the width of the printbar 200, as illustrated, or at an angle relative to the width of the printbar 200.

Figure 3:
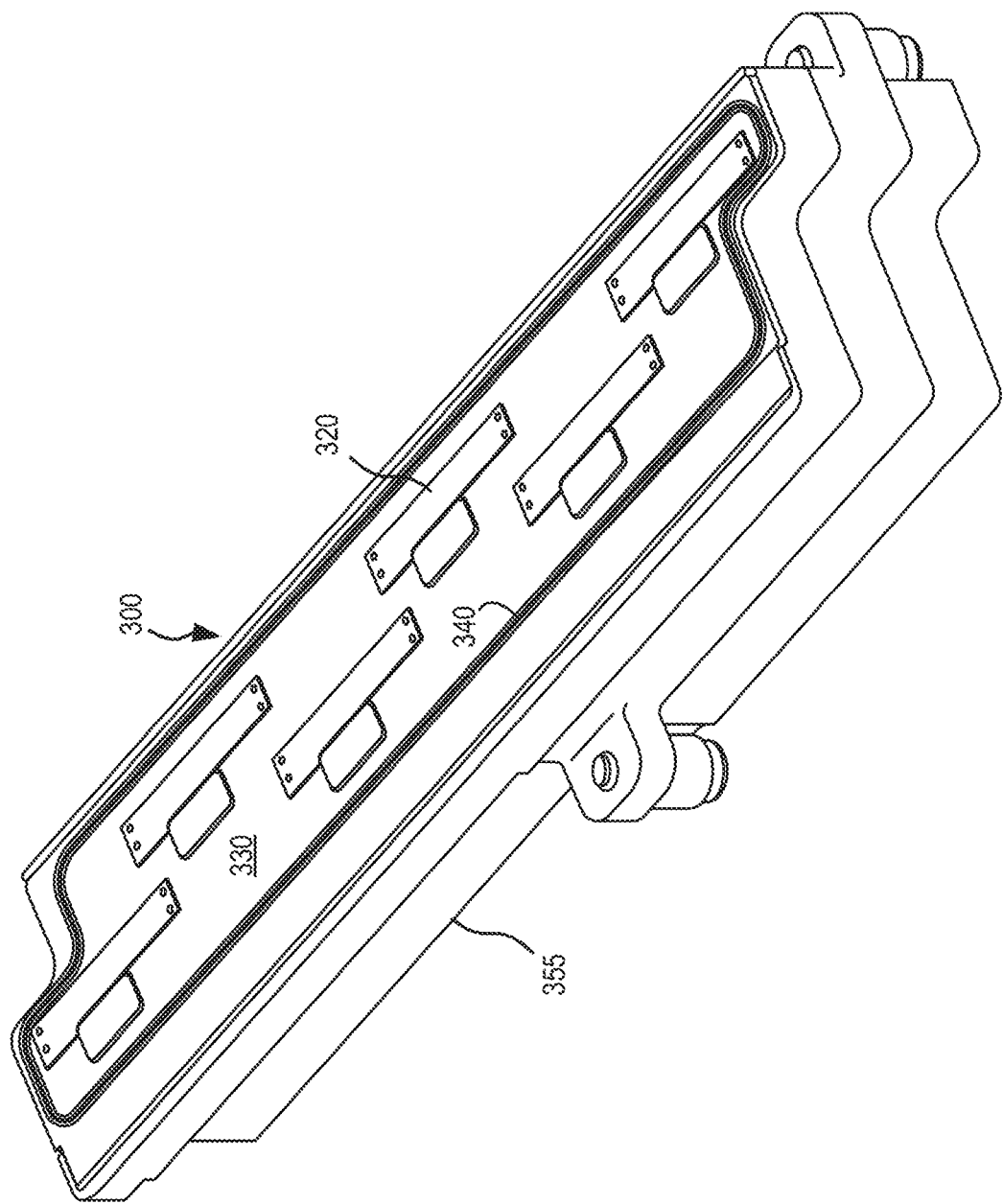
FIG. 3 illustrates a perspective view of an example seamless coplanar multi-module printbar formed from multiple S-module fluid ejection subassemblies.

FIG. 3 illustrates a perspective view of an example continuous-molded coplanar printbar 300 formed from multiple S-module fluid ejection subassemblies, each of which includes multiple fluidic dies 320. The printbar 300 is shown secured to a mount 355. The upper surface of the substrate 330 of the printbar 300 is seamless to allow for a highly effective capping seal 340 to, for example, reduce water vapor loss and ink leakage.

Figure 4:
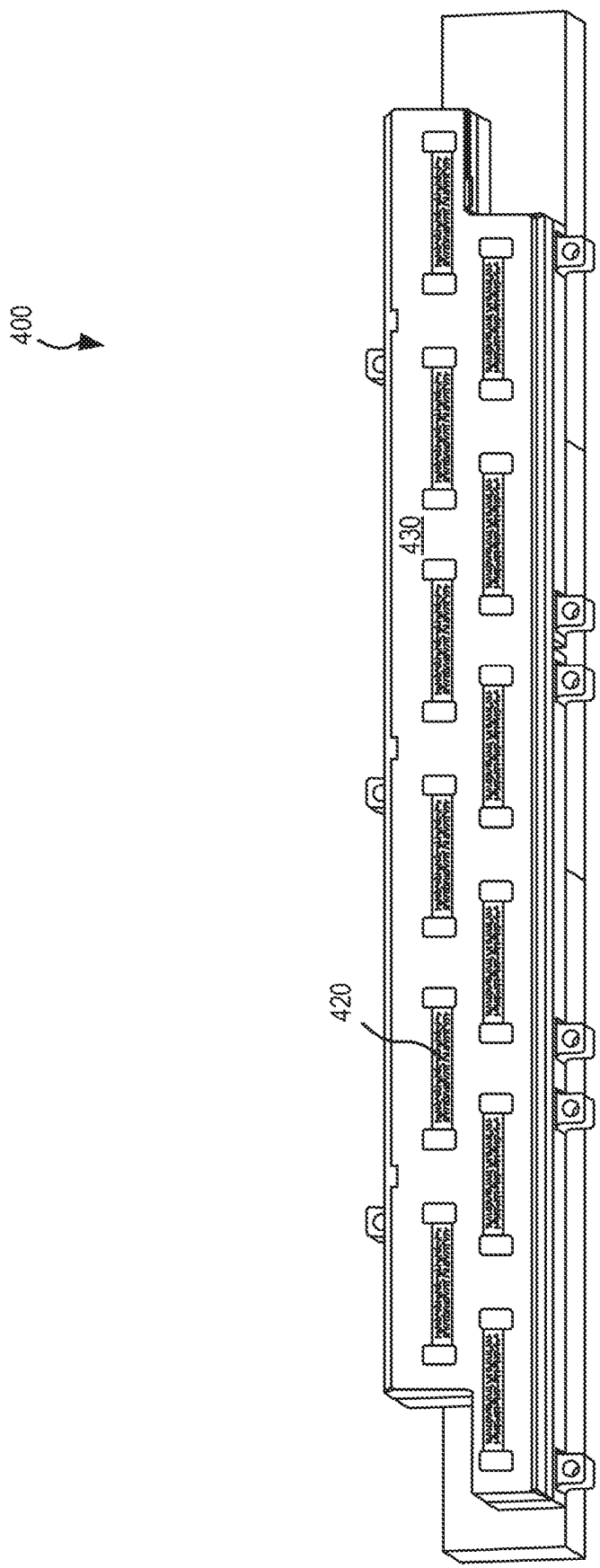
FIG. 4 illustrates another example of a top view of a seamless coplanar multi-module printbar formed from multiple S-module fluid ejection subassemblies.

FIG. 4 illustrates another example of a top view of a seamless coplanar multi-module printbar 400 formed from multiple S-module fluid ejection subassemblies. The surface of the substrate 430 is planar and continuous to allow for two rows of overlapping fluidic dies 420 that can be effectively sealed to reduce or eliminate ink or water vapor leaking. In some examples, the individual S-module fluid ejection subassemblies may include mechanical interlock structures to increase bond strength prior to being molded together to form the continuous upper surface of the substrate 430.

FIG. 5A illustrates a top view of an example conceptual block diagram of a coplanar molding process for joining three modular fluid ejection subassemblies 510 that each include three fluidic dies 520. The three fluid ejection subassemblies 510 are aligned with upper surfaces of their respective substrates 530 coplanar to one another on a temporary carrier 580 within a lower cavity of a molding system. An upper cavity of the mold aligns with the upper surfaces of the substrates 530 while mold material 505 is injected or transferred into a left leg 581 and a right leg 582 of a runner that is to convey the mold material 505 into the left seam 515 and the right seam 516, respectively. The upper cavity of the molding system constrains the mold material 505 to ensure that the mold material 505 joins the upper surfaces of the substrates 530 as a continuous, planar surface to form a seamless coplanar multi-module printbar.

The substrate 530 of each of the subassemblies 510 may be part of a molded support with a first CTE. The injected or transferred mold material 505 may be the same material as the substrate 530 and have an identical CTE. In other examples, the injected or transferred mold material 505 may be a different material than the substrate 530, but have a matching or similar CTE. For instance, each of the substrates 530 may be part of a molded EMC support for the fluidic dies 520 of each respective subassembly 510, such that the substrates 530 can be described as EMC substrates.

The mold material 505 may be selected to have the same or approximately the same CTE as the EMC substrates. In some examples, the mold material 505 and the EMC substrates may utilize the same EMC. In other examples, the mold material 505 may be a thermoplastic with a CTE corresponding to the CTE of the EMC substrates.

FIG. 5B illustrates a side view of the example conceptual block diagram of the coplanar molding process for joining three modular fluid ejection subassemblies 510. As illustrated, the temporary carrier 580 holds the three modular fluid ejection subassemblies 510 on top of the lower cavity 579 of the molding system. An upper cavity 583 of the molding system maintains a planar upper surface 584 against the substrates of the modular fluid ejection subassemblies 510. As mold material is injected or transferred into the seams between the fluid ejection subassemblies 510, the upper cavity 583 ensures that the mold material joins the respective substrates of the fluid ejection subassemblies 510 as a seamless coplanar multi-module printbar that has a single, continuous-molded planar upper surface.

Figure 6A:
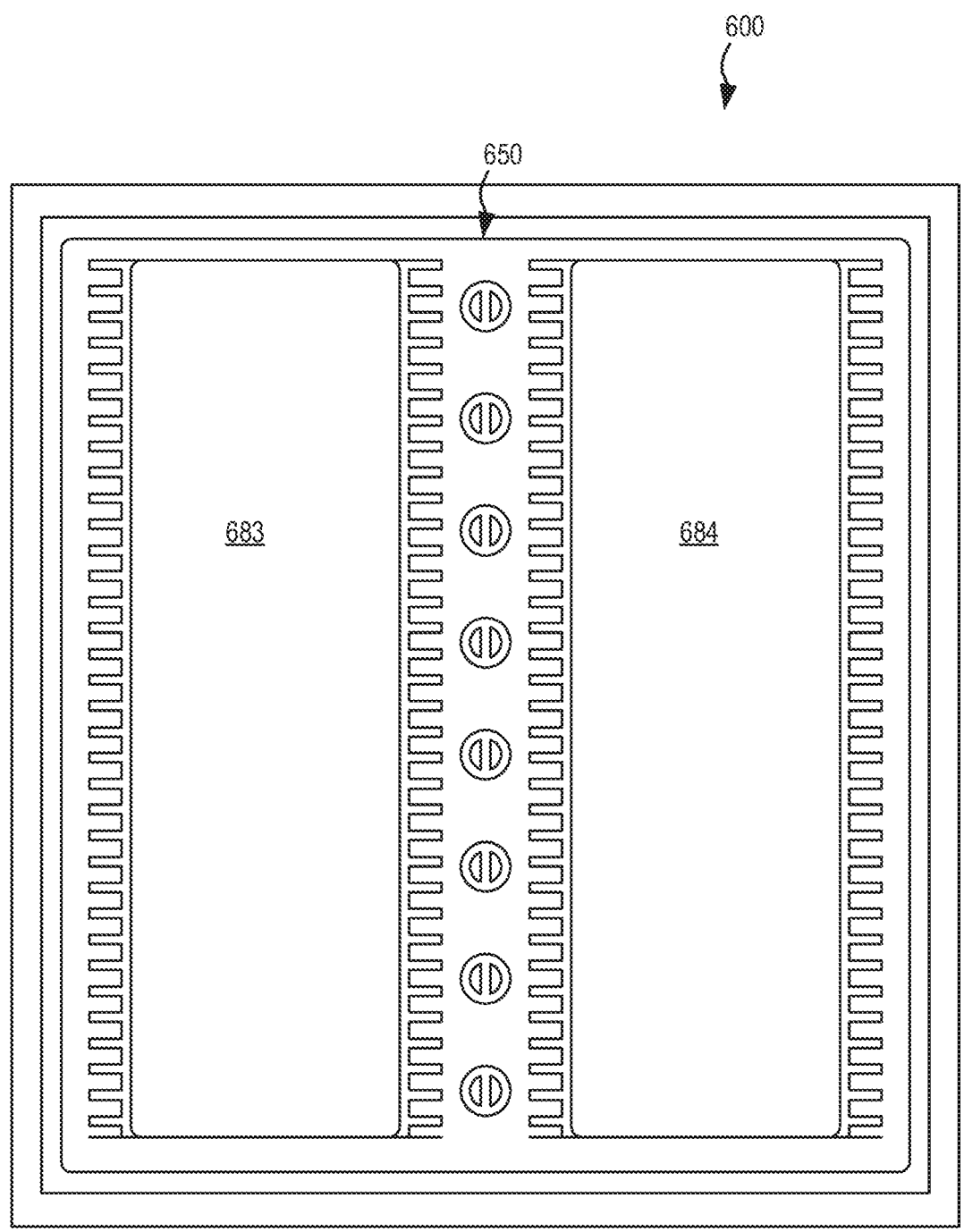
FIG. 6A illustrates an example of a mold cavity for a transfer mold process for creating a seamless coplanar multi-module printbar by joining multiple modular fluid ejection subassemblies.

FIG. 6A illustrates an example of a molding system 600 for a transfer mold process to create a seamless coplanar multi-module printbar by joining multiple modular fluid ejection subassemblies. The molding system 600 includes a left mold cavity 683 and a right mold cavity 684 to form two seamless coplanar multi-module printbars at the same time. In the illustrated example, a delivery device to deliver the mold material comprises a transfer mold carrier 650 to facilitate the transfer of the mold material along the long edges of a printbar during the formation process.

Figure 6B:
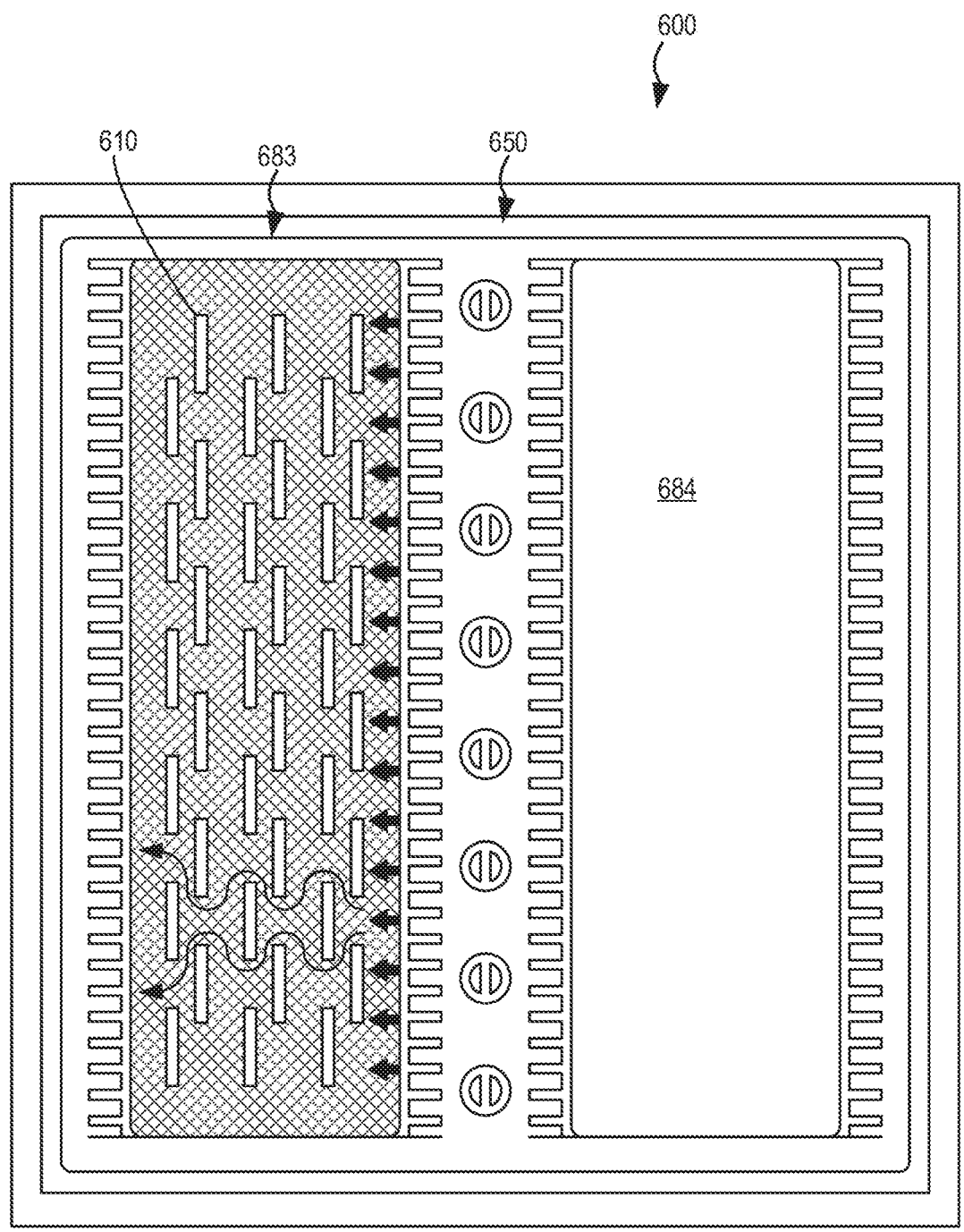
FIG. 6B illustrates an example of an epoxy mold compound (EMC) flow perpendicular to a long axis of fluidic dies of the modular fluid ejection subassemblies to form a seamless coplanar multi-module printbar.

FIG. 6B illustrates an example of an EMC mold material flowing into the seams between adjacent modular fluid ejection subassemblies that each include multiple fluidic dies 610. Divisions between the various modular fluid ejection subassemblies are not illustrated in FIG. 6B, but each modular fluid ejection subassembly may include any number of fluidic dies 610. The flow of the EMC mold material is illustrated as black arrows within the left mold cavity 683 flowing perpendicular to the long axes of the fluidic dies 610 to form a seamless coplanar multi-module printbar. The right mold cavity 684 is not occupied in the illustration but could receive a plurality of modular fluid ejection subassemblies to be simultaneously joined into a seamless coplanar multi-module printbar with the modular fluid ejection subassemblies in the left mold cavity 683.

Figure 6C:
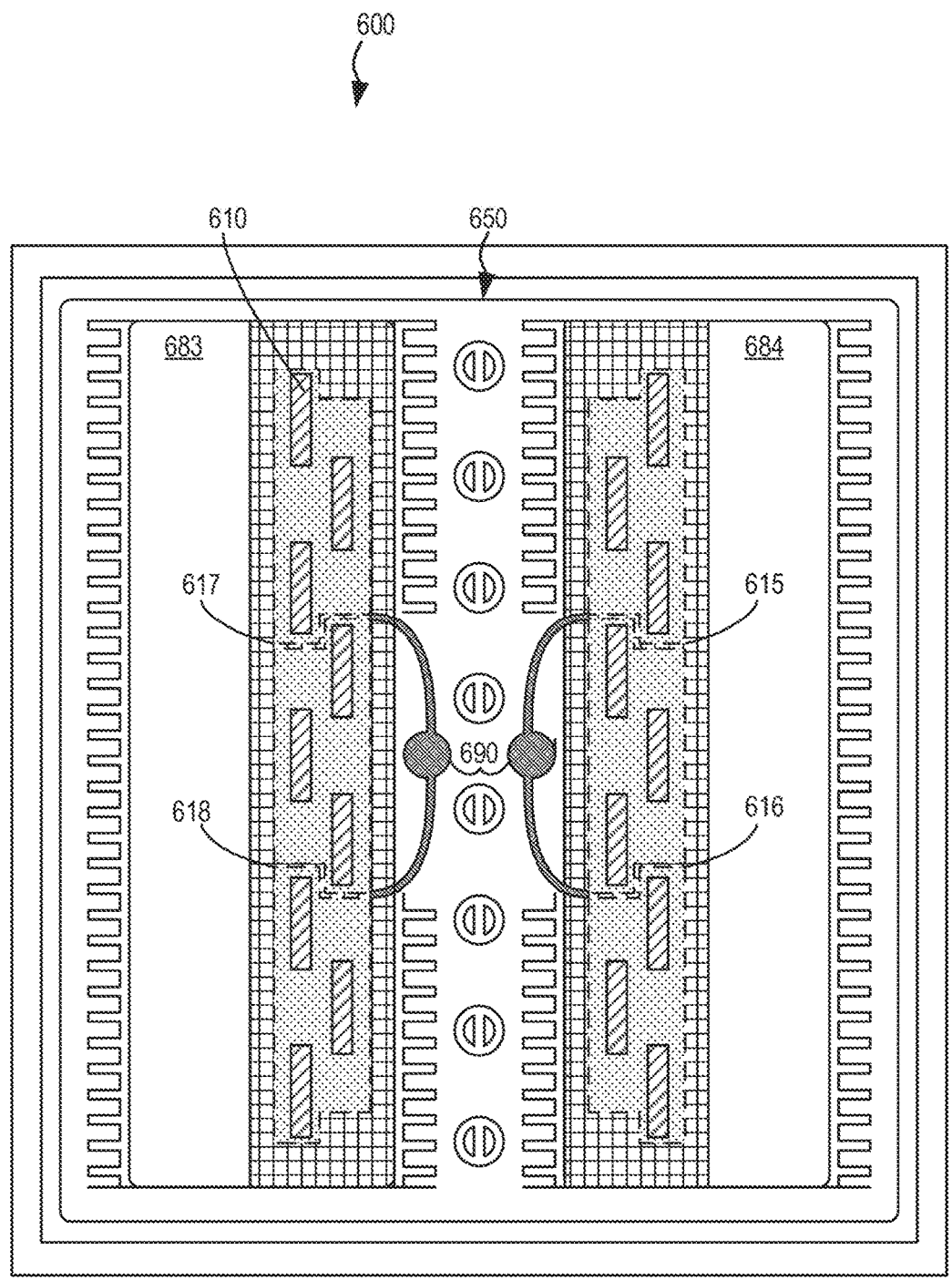
FIG. 6C illustrates an example of an EMC flow perpendicular to the long axis of the dies with EMC runners aligned with the seams between modular subassemblies.

FIG. 6C illustrates an example block diagram of the EMC mold material flowing through the transfer mold carrier 650 into EMC runners 690 aligned with the seams 615, 616, 617, and 618 between the modular subassemblies. In the illustrated example, the EMC mold material flows into the seams 615, 616, 617, and 618 which are substantially perpendicular to the long axes of the fluidic dies 610.

Figure 7A:
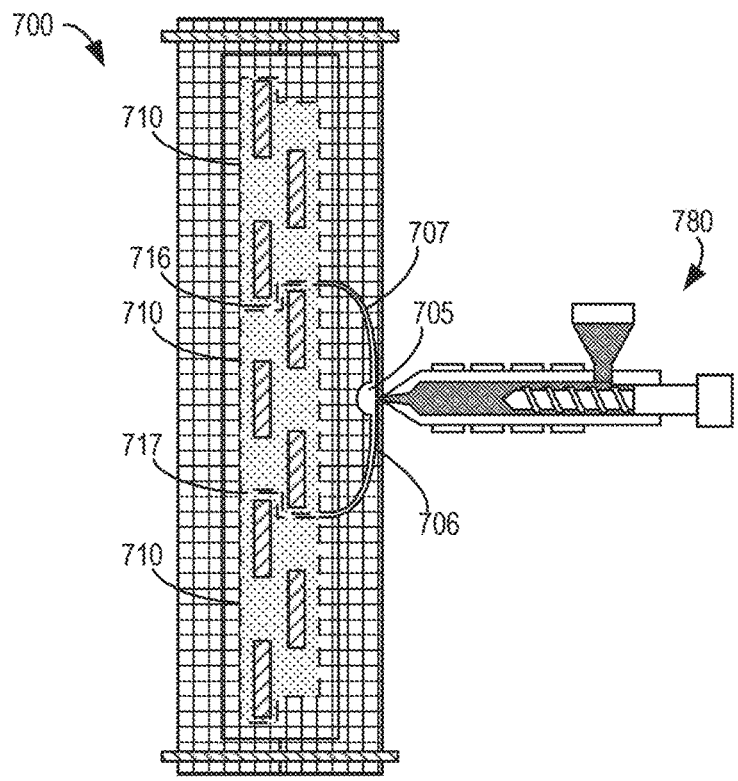
FIGS. 7A-7D illustrate a plurality of views of an example of an injection mold process for filling seams between modular fluid ejection subassemblies with thermoplastic to create a seamless coplanar multi-module printbar.

FIGS. 7A-7D illustrate various views of an example of an injection mold process for filling seams between modular fluid ejection subassemblies 710 with thermoplastic to create a seamless coplanar multi-module printbar. In FIG. 7A, the delivery device to deliver the mold material comprises an injection mold device 780 loaded with thermoplastic to be injected into a runner 705 of a molding system 700. The runner 705 includes a left leg 706 and a right leg 707 to convey the thermoplastic into the seams 716 and 717 between the three adjacent modular fluid ejection subassemblies 710. As should be understood, other combinations of runners and seams (e.g., three runners and four seams, etc.) are contemplated by claimed subject matter.

Figure 7B:
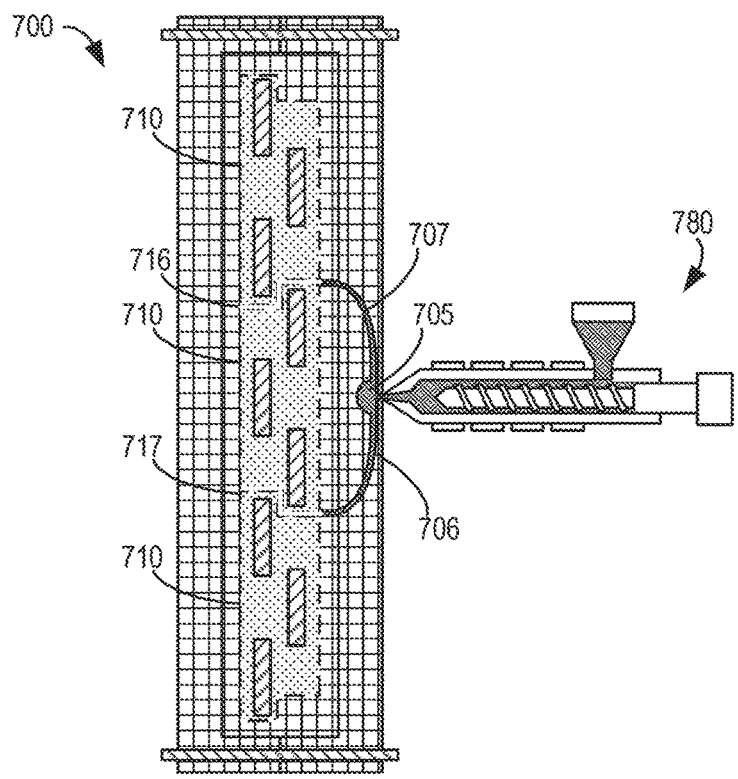

FIG. 7B illustrates the thermoplastic (darker fill pattern) injected into the runner 705 and flowing through the left leg 706 and the right leg 707 prior to entering the seams 716 and 717 between the adjacent modular subassemblies 710.

Figure 7C:
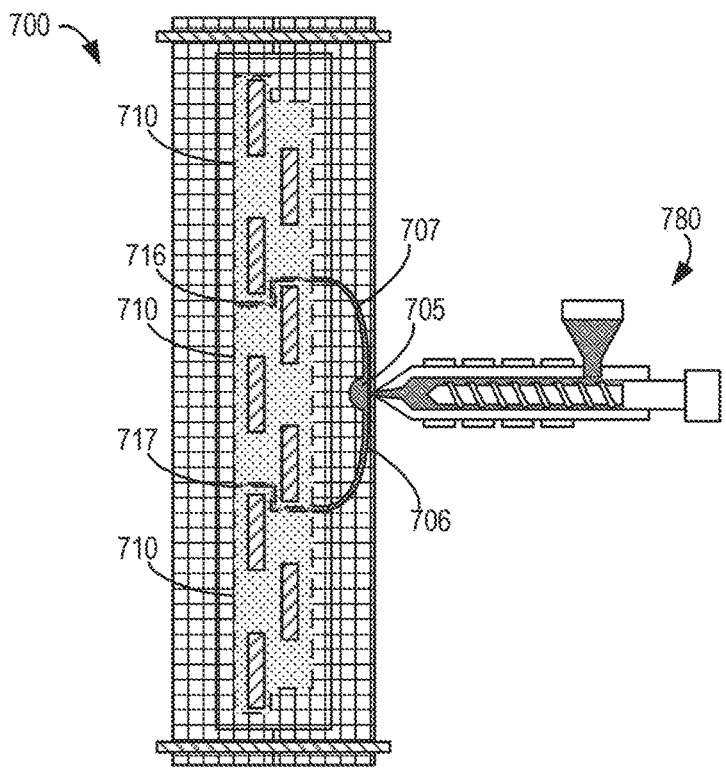

FIG. 7C illustrates the thermoplastic forced into the seams 716 and 717 within the confinement of the upper and lower cavities of the mold 700 to form a seamless coplanar multi-module printbar.

Figure 7D:
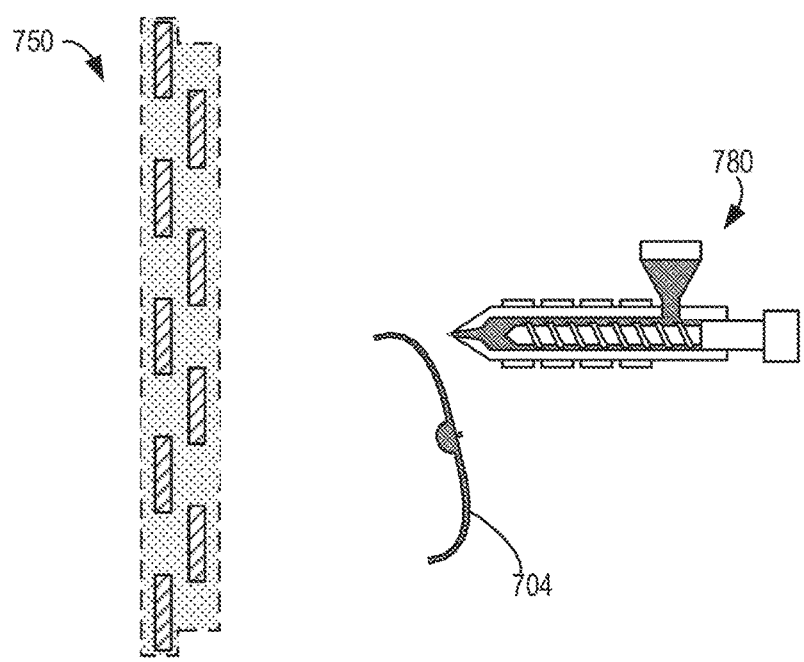

FIG. 7D illustrates the seamless coplanar multi-module printbar 750 removed from the molding system 700 (FIG. 7C). The thermoplastic 704 that was within the runner 705 can be discarded and the injection mold device 780 can be used again in combination with the molding system 700 to form another seamless coplanar multi-module printbar 750. FIGS. 7C and 7D illustrate the three modular fluid ejection subassemblies 710 of FIG. 7C molded together to form the seamless coplanar multi-module printbar 750 shown in FIG. 7D.

In many of the illustrated examples, the modular fluid ejection subassemblies are arranged with the mold material flowing perpendicular to the long axes of the fluidic dies of the thermal printhead. In other examples, the fluidic dies may be arranged at an angle relative to the long edges of the modular fluid ejection subassemblies. In such examples, the mold material may flow into seams between adjacent modular fluid ejection subassemblies at an angle relative to the long axes of the fluidic dies. In still other examples, the modular fluid ejection subassemblies may be arranged within the molding system to facilitate EMC or thermoplastic flow parallel to the long axes of the fluidic dies to reduce blockage (i.e., increase flow) and reduce or eliminate shifting of the fluidic dies during the mold process. In examples in which EMC is used as the substrate (e.g., as a molded support for the fluidic dies) and EMC is used for the molding process, the resulting seamless coplanar multi-module printbar may comprise a continuous-molded, homogeneous EMC substrate supporting any number of fluidic dies.

Specific examples and applications of the disclosure are described above and illustrated in the figures. It is, however, understood that many adaptations and modifications can be made to the precise configurations and components detailed above. In some cases, well-known features, structures, or operations are not shown or described in detail. Furthermore, the described features, structures, or operations may be combined in any suitable manner. It is also appreciated that the components of the examples as generally described and illustrated in the figures herein could be arranged and designed in a wide variety of different configurations. Thus, all feasible permutations and combinations of examples are contemplated.

In the description above, multiple features are sometimes grouped together in a single example, figure, or description thereof for the purpose of streamlining the disclosure. However, as the following claims reflect, inventive aspects lie in a combination of fewer than all features of any single foregoing disclosed example. Thus, the claims are hereby expressly incorporated into this Detailed Description, with each claim standing on its own as a separate example. This disclosure includes all permutations and combinations of the independent claims with their dependent claims.

What is claimed is:

1. A molding system, comprising:
   a lower mold cavity to receive modular fluid ejection subassemblies aligned such that an upper surface of a substrate of each modular fluid ejection subassembly is coplanar with an upper surface of a substrate of an adjacent modular fluid ejection subassembly;
   an upper mold cavity planarly aligned with the coplanar upper surfaces of the substrates of the modular fluid ejection subassemblies;
   a runner to convey a mold material between the lower mold cavity and the upper mold cavity proximate a seam between two adjacent modular fluid ejection subassemblies, the runner aligned with the seam; and
   a delivery device to deliver the mold material into the runner to fill the seam between the adjacent modular fluid ejection subassemblies,
   wherein the upper mold cavity constrains the delivered mold material coplanar with the upper substrate surfaces of the modular fluid ejection subassemblies.

2. The molding system of claim 1, wherein each of the modular fluid ejection subassemblies comprises an S-module fluid ejection subassembly with two rows of fluidic dies offset from one another in an S-shape configuration.

3. The molding system of claim 2, wherein each fluidic die comprises a thermal ink jet (TIJ) fluidic die.

4. The molding system of claim 2, wherein each fluidic die comprises an array of piezo ink jet (PIJ) fluidic dies.

5. The molding system of claim 1, wherein the mold material comprises epoxy mold compound (EMC) with a coefficient of thermal expansion (CTE) equal to that of the substrates of the modular fluid ejection subassemblies, and
   wherein the delivery device comprises a transfer mold carrier to facilitate EMC flow into the runner.

6. The molding system of claim 1, wherein mold material comprises a thermoplastic with a coefficient of thermal expansion (CTE) that approximates that of the substrates of the modular fluid ejection subassemblies, and
   wherein the delivery device comprises an injection mold device to inject the thermoplastic into the runner.

7. The molding system of claim 1, wherein the lower and upper mold cavities are sized to receive three modular fluid ejection subassemblies, and wherein the runner has:
   a first leg to convey the mold material to a first seam between a first modular fluid ejection subassembly and a second modular fluid ejection subassembly, and
   a second leg to convey the mold material to a second seam between the second modular fluid ejection subassembly and a third modular fluid ejection subassembly.

8. A method of manufacturing a printbar, comprising:
   aligning a first modular fluid ejection subassembly with a second modular fluid ejection subassembly such that an upper surface of a substrate of the first modular fluid ejection subassembly is coplanar with an upper surface of a substrate of the second modular fluid ejection subassembly;
   positioning the aligned first and second modular fluid ejection subassemblies within a lower mold cavity of a mold;
   aligning an upper mold cavity of the mold with the upper surfaces of the substrates of the first and second modular fluid ejection subassemblies; and
   directing a mold material into a runner between the lower mold cavity and the upper mold cavity to fill a seam between the aligned first and second modular fluid ejection subassemblies to form a multi-module printbar with a seamless, continuous planar surface between the first and second modular fluid ejection subassemblies, wherein the runner aligns with the seam.

9. The method of claim 8, further comprising:
aligning a third modular fluid ejection subassembly with the second modular fluid ejection subassembly, such that an upper surface of a substrate of the third modular fluid ejection subassembly is coplanar with the upper surfaces of the substrates of the first and second modular fluid ejection subassemblies;
positioning the aligned first, second, and third modular fluid ejection subassemblies within the lower cavity of the mold; and
aligning the upper mold cavity of the mold with the upper surfaces of the substrates of the first, second, and third modular fluid ejection subassemblies,
wherein directing the mold material into the runner further comprises directing the mold material between the lower mold cavity and the upper mold cavity to fill a seam between the aligned second and third modular fluid ejection subassemblies to form the multi-module printbar with a seamless, continuous planar surface between the first, second and third modular fluid ejection subassemblies.

10. The method of claim 8, wherein each of the first and second modular fluid ejection subassemblies comprises an array of thermal ink jet (TIJ) fluidic dies.

11. The method of claim 8, wherein the mold material comprises epoxy mold compound (EMC) with a coefficient of thermal expansion (CTE) that is equal to that of a substrate of the modular fluid ejection subassemblies, and
wherein directing the mold material into the runner comprises a transfer mold process.

12. The method of claim 8, wherein mold material comprises a thermoplastic with a coefficient of thermal expansion (CTE) that approximates that of the substrates of the first and second modular fluid ejection subassemblies, and wherein directing the mold material into the runner comprises an injection mold process.

13. The method of claim 8, wherein each of the modular fluid ejection subassemblies comprises an S-module fluid ejection subassembly with two rows of fluidic dies offset from one another in an S-shape configuration.

14. The method of claim 8, wherein each of the modular fluid ejection subassemblies comprises fluidic dies orientated at an angle relative to a long axis of the multi-module printbar.

15. A manufacturing mold, comprising:
a lower mold cavity to receive
a first modular fluid ejection subassembly aligned with a second modular fluid ejection subassembly, and
a third modular fluid ejection subassembly aligned with the second modular fluid ejection subassembly,
wherein the first, second, and third modular fluid ejection subassemblies are aligned with the lower mold cavity such that substrates of each of the first, second, and third modular fluid ejection subassemblies are coplanar with respect to one another;
a first leg of a runner to convey mold material into a first seam between the first modular fluid ejection subassembly and the second modular fluid ejection subassembly, the first leg aligned with the first seam;
a second leg of a runner to convey mold material into a second seam between the second modular fluid ejection subassembly and the third modular fluid ejection subassembly, the second leg aligned with the second seam; and
an upper mold cavity to maintain the conveyed mold material coplanar with the substrates of the first, second, and third modular fluid ejection subassemblies.

* * * * *